United States Patent
Yoshimura

(10) Patent No.: US 8,176,939 B2
(45) Date of Patent: May 15, 2012

(54) FLUID PRESSURE EQUIPMENT PROVIDED WITH LOW SLIDING PACKING

(75) Inventor: Shinichi Yoshimura, Tsukubamirai (JP)

(73) Assignee: SMC Corporation, Tokyo (JP)

( * ) Notice: Subject to any disclaimer, the term of this patent is extended or adjusted under 35 U.S.C. 154(b) by 434 days.

(21) Appl. No.: 12/572,461

(22) Filed: Oct. 2, 2009

(65) Prior Publication Data

US 2010/0096033 A1    Apr. 22, 2010

(30) Foreign Application Priority Data

Oct. 21, 2008  (JP) ................. 2008-270857

(51) Int. Cl.
*F16K 11/07*  (2006.01)
(52) U.S. Cl. .................. 137/625.69; 277/561
(58) Field of Classification Search ............. 137/625.69; 251/214; 277/551, 644, 648, 649, 641, 459, 277/464, 465, 504, 402, 407, 584, 560, 561, 277/638

See application file for complete search history.

(56) References Cited

U.S. PATENT DOCUMENTS

| | | | |
|---|---|---|---|
| 5,171,025 A * | 12/1992 | Stoll et al. | 277/577 |
| 5,337,787 A * | 8/1994 | Fiondella | 137/625.69 |
| 5,513,674 A * | 5/1996 | Frisch | 137/625.69 |
| 5,609,343 A * | 3/1997 | Asou et al. | 277/552 |
| 5,934,323 A * | 8/1999 | Akimoto et al. | 137/625.69 |
| 5,971,022 A * | 10/1999 | Hayashi et al. | 137/625.69 |
| 5,988,591 A * | 11/1999 | Akimoto et al. | 251/324 |
| 6,264,206 B1 * | 7/2001 | Hashizawa et al. | 277/641 |

FOREIGN PATENT DOCUMENTS

| | | |
|---|---|---|
| DE | 197 06 059 A1 | 8/1998 |
| JP | 62-91063 | 6/1987 |
| JP | 62-126663 | 8/1987 |
| JP | 04-36174 | 3/1992 |
| JP | 7-269733 | 10/1995 |
| JP | 2537236 | 3/1997 |

OTHER PUBLICATIONS

Office Action issued Jul. 19, 2011 in Japan Application No. 2008-270857 (With English Translation).
Office Action issued Jun. 24, 2011, in Chinese Patent Application No. 200910180564.7 (with English-language Translation).
Office Action issued Aug. 11, 2011, in Korean Patent Application No. 10-2009-0099143 (with English-language Translation).
Office Action issued Oct. 26, 2010, in Japanese Patent Application No. 2008-270857 (with English translation).

* cited by examiner

*Primary Examiner* — John Fox
*Assistant Examiner* — Seth Faulb
(74) *Attorney, Agent, or Firm* — Oblon, Spivak, McClelland, Maier & Neustadt, L.L.P.

(57) ABSTRACT

A packing attached to a spool of a spool valve has a ring-shaped inner-peripheral seal portion provided with an inner-peripheral seal face, a ring-shaped outer-peripheral seal portion provided with an outer-peripheral seal face, and an intermediate flexible portion interposed between the both portions and curved by an action of a fluid pressure, the intermediate flexible portion has both right and left flat side faces parallel with each other, a thickness of the intermediate flexible portion is formed smaller than the inner-peripheral seal portion and the outer-peripheral seal portion, and a ring width of the intermediate flexible portion in a packing radial direction is formed equal to or larger than the thickness.

8 Claims, 3 Drawing Sheets

FLUID PRESSURE EQUIPMENT PROVIDED WITH LOW SLIDING PACKING

BACKGROUND OF THE INVENTION

1. Field of the Invention

The present invention relates to a fluid pressure equipment such as a fluid switching valve, a fluid-pressure cylinder and the like and particularly to a fluid pressure equipment provided with a low-sliding packing with small sliding resistance.

2. Description of the Related Art

In fluid pressure equipments such as an electromagnetic valve, a fluid-pressure cylinder and the like, a packing is mounted on an outer periphery of a sliding member such as a spool, a piston and the like such that the sliding member slides in a flow-passage hole through the packing.

The packing is offered in various types such as those with a circular sectional shape like an O-ring, those with a partially constricted gourd shape, Y-shape or U-shape and the like, and they are used according to the type, use conditions and the like of the fluid pressure equipment. Among them, since a packing with a gourd-shaped section has large stretching properties in a radial direction, its sliding resistance is smaller than that of the O-ring, and its sealing performance is also excellent, it is widely used in the spool, piston and the like. For example, Japanese Registered Utility Model No. 2537236 discloses a spool valve, which is one type of the fluid pressure equipment, in which a partially constricted gourd-shaped packing is mounted on the outer periphery of the spool, which is a sliding member.

However, since the prior-art gourd-shaped packing has large stretching properties in the radial direction, if a fluid pressure acts on one side face and the packing is pressed onto a groove side wall of a packing housing groove, the packing is compressed and stretched in the radial direction, and seal faces on the inner and outer peripheries are strongly pressed into contact with a target portion, which increases a squeeze amount. The increase in the squeeze amount increases sliding resistance of the packing, which leads not only to deterioration of response of the spool, that is, the sliding member, but also to fixation of the packing when the sliding member stands still, delay in start when the sliding member is switched and the like and they further lead to deterioration in reliability of the fluid pressure equipment.

BRIEF SUMMARY OF INVENTION

An object of the present invention is to provide a fluid pressure equipment in which the above problems are solved and response and reliability are improved by using an improved low-sliding packing whose sliding resistance is further reduced by improving the prior-art gourd-shaped packing.

In order to achieve the above object, the fluid pressure equipment of the present invention has a housing provided with a flow-passage hole though which a pressure fluid flows and sliding member slidable in the flow-passage hole in an axial direction of the flow-passage hole, in which a packing housing groove is formed in an outer periphery of the sliding member, and a ring-shaped packing is housed in the packing housing groove.

The packing is constituted by a ring-shaped inner-peripheral seal portion provided with an arc-shaped inner-peripheral seal face brought into contact with a groove bottom of the packing housing groove, a ring-shaped outer peripheral seal portion provided with an arc-shaped outer-peripheral seal face in sliding contact with a hole inner face of the flow-passage hole, and a ring-shaped intermediate flexible portion formed by providing a ring-shaped recess groove with a flat bottom in a region between the inner-peripheral seal portion and the outer-peripheral seal portion on both right and left side faces of the packing and curved by an action of a fluid pressure.

The inner-peripheral seal portion and the outer-peripheral seal portion have both right and left flat side faces in parallel with each other, the thickness of the inner-peripheral seal portion and the outer-peripheral seal portion is equal to each other and formed smaller than the groove width of the packing housing groove, the intermediate flexible portion has both right and left flat side faces in parallel with each other, the thickness of the intermediate flexible portion is formed smaller than the thickness of the inner-peripheral seal portion and the outer-peripheral seal portion, and a ring width of the intermediate flexible portion in the packing radial direction is equal to or larger than the thickness of the intermediate flexible portion.

In the present invention, radiuses of curvature of the arcs of the inner-peripheral seal face and the outer-peripheral seal face of the packing are preferably smaller than one half of the width of the packing in the radial direction and the radius of curvature of the outer-peripheral seal face is smaller than the radius of curvature of the inner-peripheral seal face.

Also, in the present invention, a ring width of the intermediate flexible portion of the packing is preferably larger than a ring width of the inner-peripheral seal portion and the outer-peripheral seal portion, and the intermediate flexible portion of the packing is preferably brought into contact with one groove side wall of the packing housing groove when it is bent by an action of a fluid pressure.

In the present invention, when a fluid pressure does not act on either of the right and left side faces of the packing or when the pressure uniformly acts on them, the intermediate flexible portion of the packing is not bent in either of right or left side, and the packing maintains a symmetrical attitude extending straightforward in the radial direction.

If the sliding member is switched and a fluid pressure acts on one side face of the packing, the intermediate flexible portion is bent by the fluid pressure in the other side face direction, and the packing is deformed into a C-shape. This deformation is performed smoothly and reliably since the intermediate flexible portion has the both right and left flat side faces in parallel with each other, the thickness of the intermediate flexible portion is thinner than the inner-peripheral seal portion and the outer-peripheral seal portion, and the ring width of the intermediate flexible portion in the packing radial direction is equal to or larger than the thickness of the intermediate flexible portion. Since a distance between the inner-peripheral seal face and the outer-peripheral seal face of the packing is reduced by this deformation, a squeeze amount of the packing is decreased, and sliding resistance is reduced.

DETAILED DESCRIPTION OF INVENTION

Figure 1:
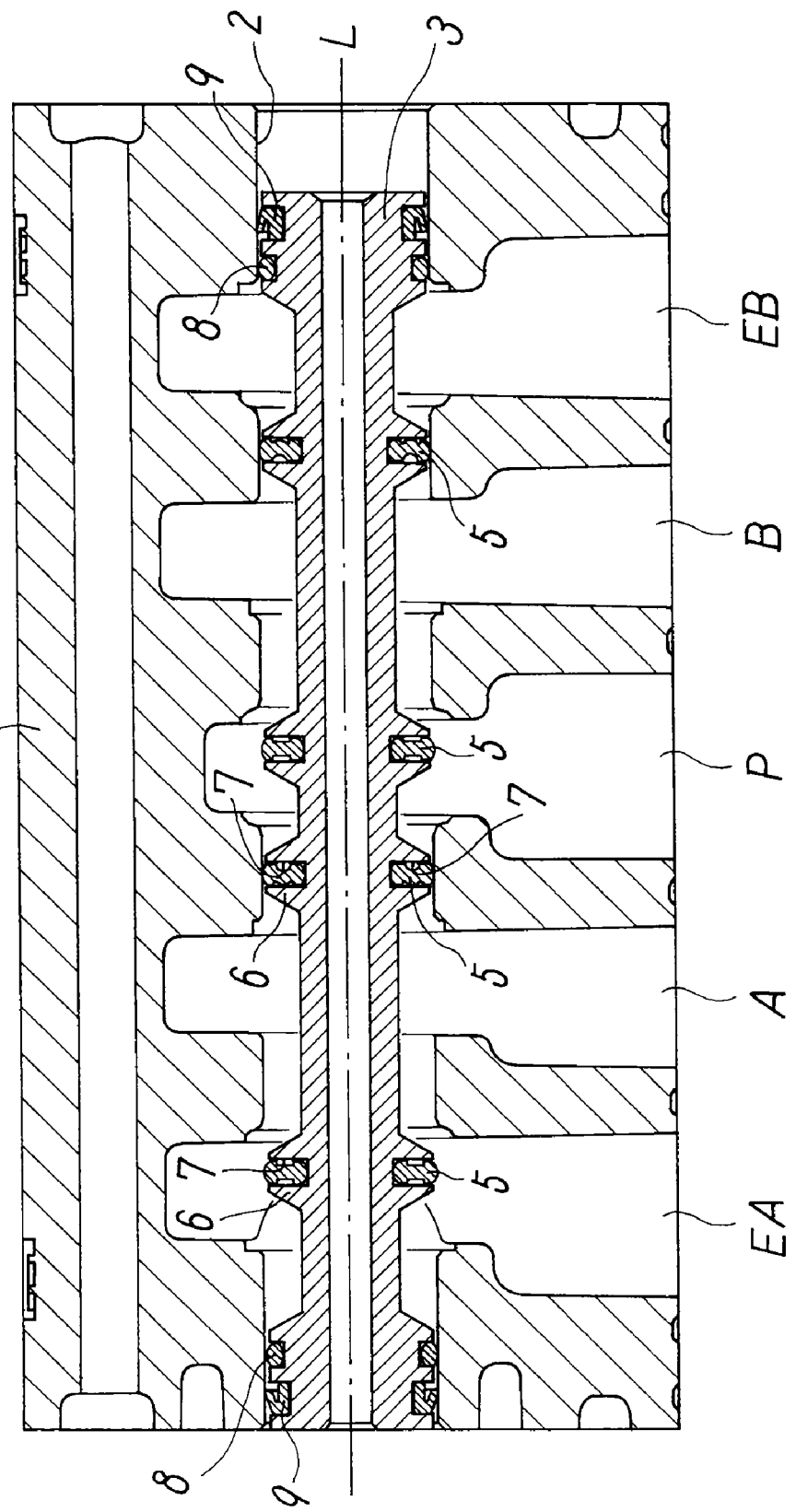
FIG. 1 is a sectional view illustrating an embodiment in which the present invention is applied to a spool valve.

An embodiment of a fluid pressure equipment according to the present invention will be described below based on the attached drawings. FIG. 1 describes a 5-port type spool valve as an example of the fluid pressure equipment. This spool valve has a housing 1 having a rectangular sectional shape and elongate in one direction, and inside the housing 1, a circular flow-passage hole 2 extending in a longitudinal direction of the housing 1 is formed, five ports P, A, B, EA, EB communicating with the flow-passage hole 2 are formed in the bottom face of the housing 1, and a spool 3 as a sliding member for switching the flow passage among the five ports is slidably inserted into the flow-passage hole 2 in an axis L direction of the flow-passage hole 2.

The spool 3 is switched to forward or backward in the flow-passage hole 2 by appropriate driving means using electromagnetic power, fluid pressure or the like, but the driving means is not shown.

The five ports include a central supply port P, first and second two output ports A and B located on both sides of the supply port P, and first and second two discharge ports EA and EB located on both sides of the output ports A and B, and these ports communicate with the flow-passage hole 2 in the above-mentioned arrangement.

The spool 3 has four packings 5 opening/closing a hole portion between the adjacent ports in the flow-passage hole 2. In order to mount these packings 5, a plurality of packing mounting portions 6 extending in a flange state are formed on the spool 3, and on outer periphery of the packing mounting portion 6, an annular packing housing groove 7 having predetermined groove width and depth is formed so as to surround the spool 3, and in the packing housing groove 7, the ring-shaped packings 5 are housed so that a part of the outer peripheries of the packing 5 protrude outside of the packing housing groove 7.

Also, at both ends of the spool 3, a guide ring 8 for guiding movement of the spool 3 and a seal member 9 for sealing between the discharge ports EA, EB and the outside of the flow-passage hole 2 are provided.

The packing 5 is formed by synthetic rubber similar to a known usual packing, and as known from FIGS. 2 to 5, the packing is constituted by a ring-shaped inner-peripheral seal portion 5A provided with an inner-peripheral seal face 11 brought into contact with a flat groove bottom 7a of the packing housing groove 7, a ring-shaped outer-peripheral seal portion 5B provided with an outer-peripheral seal face 12 in sliding contact with a hole inner face of the flow-passage hole 2, and a ring-shaped intermediate flexible portion 5C located between the inner-peripheral seal portion 5A and the outer-peripheral seal portion 5B and bent by an action of a fluid pressure, and the packing is formed symmetrically with respect to a virtual plane S orthogonal to the axis L, which is also a center axis of the packing 5.

The inner-peripheral seal portion 5A is surrounded by the arc-shaped inner-peripheral seal face 11 and both right and left flat side faces 13 in parallel with each other, while the outer-peripheral seal portion 5B is surrounded by the arc-shaped outer-peripheral seal face 12 and the both right and left flat side faces 14 in parallel with each other, and the side faces 13 and 14 of the inner-peripheral seal portion 5A and the outer-peripheral seal portion 5B are located on the same plane orthogonal to the axis L. Therefore, thicknesses T in the axis L direction of the inner-peripheral seal portion 5A and the outer-peripheral seal portion 5B are equal to each other and constant, and moreover, they are smaller than the groove width of the packing housing groove 7. Thus, between a groove side wall 7b of the packing housing groove 7 and the side face of the packing 5, a gap 15 in which the packing 5 can be bent is formed. The thicknesses T of the inner-peripheral seal portion 5A and the outer-peripheral seal portion 5B are equal to the thickness of the packing 5.

Also, a ring width Wb in the packing radial direction of the outer-peripheral seal print 5B is formed equal to or smaller than a ring width Wa of the inner-peripheral seal portion 5A.

The inner-peripheral seal face 11 and the outer-peripheral seal face 12 have an arc shape projecting outward, and a radius of curvature of the arc is smaller than on half of the width W in the radial direction of the packing 5. In this case, the radiuses of curvature of the inner-peripheral seal face 11 and the outer-peripheral seal face 12 may be equal to each other, but in the illustrated embodiment, the radius of curvature of the outer-peripheral seal face 12 sliding on the hole inner face of the flow-passage hole 2 is formed smaller than the radius of curvature of the inner-peripheral seal-face 11 in contact with the groove bottom 7a of the packing housing groove 7 and not sliding. However, the radius of curvature of the inner-peripheral seal face 11 may be formed smaller than the radius of curvature of the outer-peripheral seal face 12.

Also, the inner-peripheral seal face 11 is formed so as to cover the entire thickness of the packing 5, while the outer-peripheral seal face 12 is partially formed in an inner region excluding a part of both ends of the packing 5 in the thickness direction. However, to the contrary, the inner-peripheral seal face 11 may be partially formed in the above-mentioned inner region, while the outer-peripheral seal face 12 may be formed so as to cover the entire thickness of the packing 5. Alternatively, both the inner-peripheral seal face 11 and the outer-peripheral seal face 12 may be formed so as to cover the entire thickness of the packing 5 or may be partially formed in the inner region excluding a part of both ends of the packing 5 in the thickness direction.

In a part of the inner-peripheral seal portion 5A and the outer-peripheral seal portion 5B, a plurality of small grooves 17 crossing the both portions 5A and 5B in the radial direction are formed. The small grooves 17 prevent formation of a sealed space between the packing 5 and the groove side wall 7b as well as the groove bottom 7a when the side faces of the packing 5, that is, the side faces 13 and 14 of the inner-peripheral seal portion 5A and the outer-peripheral seal portion 5B are brought into contact with the groove side wall 7b of the packing housing groove 7 and prevent suctioning of the packing 5 by the sealed space.

The intermediate flexible portion 5C reduces sliding resistance by bending the packing 5 by the intermediate flexible portion 5C when a fluid pressure acts on the packing 5 and is constituted as follows so that the packing can be bent to a smooth curved face by an action of the fluid pressure while flexibility required for curving is maintained.

That is, the intermediate flexible portion 5C is formed by providing a symmetric ring-shaped recess groove 18 with a flat bottom in a region between the inner-peripheral seal portion 5A and the outer-peripheral seal portion 5B of the both right and left side faces of the packing 5. Therefore, both right and left side faces 19 of the intermediate flexible portion 5C are flat and parallel with each other and they are faces orthogonal to the axis L, and a thickness Tc of the intermediate flexible portion 5C is smaller than the thickness T of the inner-peripheral seal portion 5A and the outer-peripheral seal portion 5B and is constant over the entire intermediate flexible portion 5C. A preferable range of a ratio Tc/T between the thicknesses T and Tc is 0.6 to 0.65.

Also, the ring width Wc of the intermediate flexible portion 5C in the packing radial direction is formed equal to the thickness Tc of the intermediate flexible portion 5C or larger than the thickness Tc. Preferably, the ring width Wc of the intermediate flexible portion 5C is formed larger than the ring widths Wa and Wb of the inner-peripheral seal portion 5A and the outer-peripheral seal portion 5B.

Figure 2:
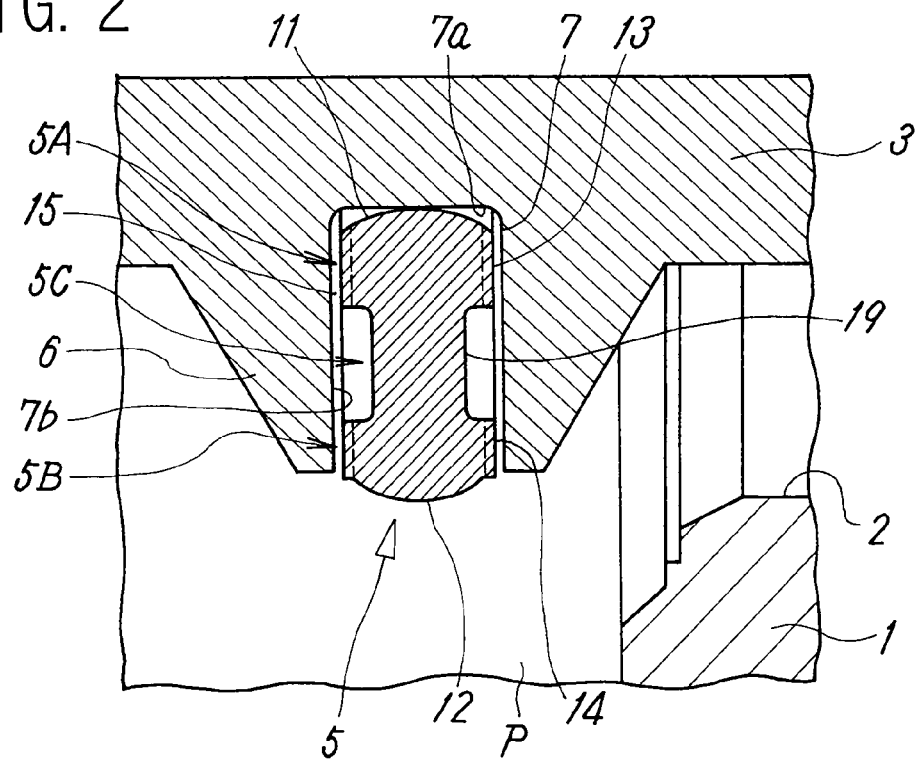
FIG. 2 is a partially enlarged view of FIG. 1.

With regard to the packing 5 constituted as above, if a fluid pressure does not act on either of side faces of the packing 5 or if an equal fluid pressure acts when the flow-passage hole 2 is opened, the intermediate flexible portion 5C is not bent in either side of right or left as shown in FIG. 2, and the packing 5 maintains the symmetric attitude linearly extending in the radial direction.

Figure 3:
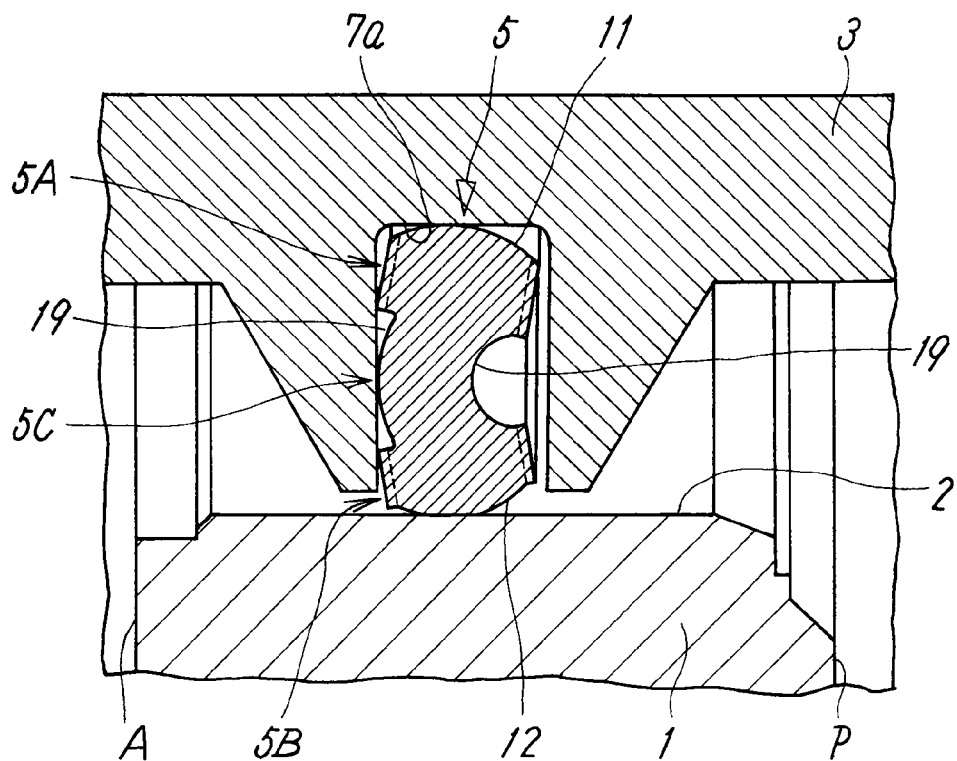
FIG. 3 is another partially enlarged view of FIG. 1.
Figure 4:
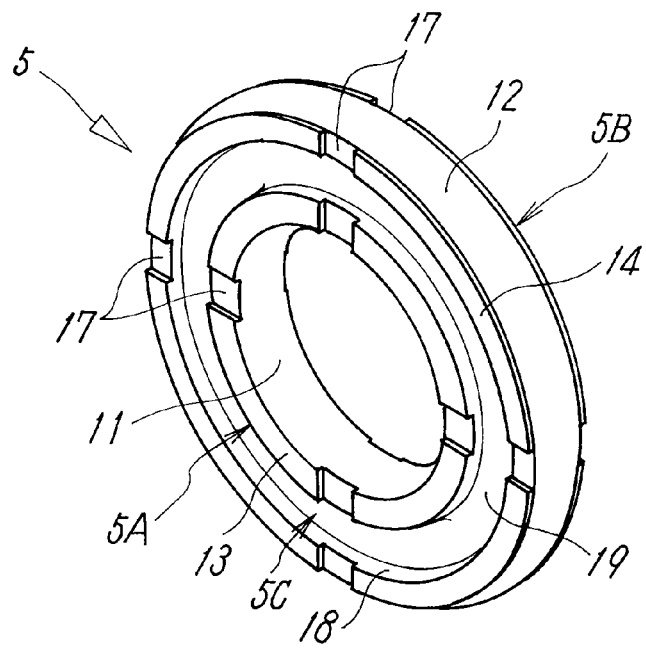
FIG. 4 is a perspective view of a packing.
Figure 5:
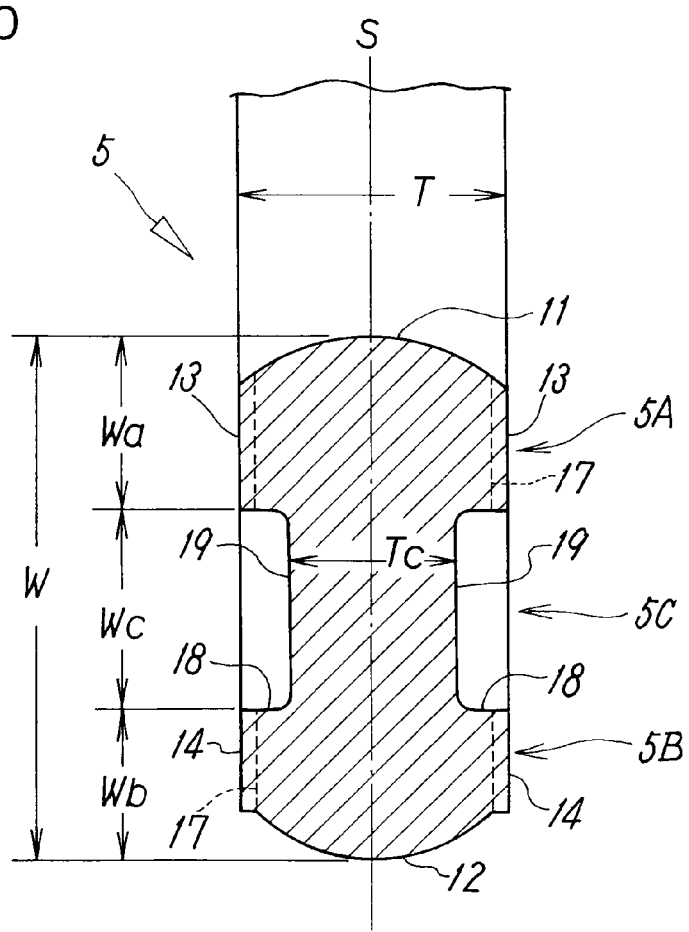
FIG. 5 is a partially enlarged sectional view of the packing.

On the other hand, if a fluid pressure acts on one of the side faces of the packing 5 by closing the flow-passage hole 2 with the packing 5, as shown in FIG. 3, the intermediate flexible portion 5C of the packing 5 is smoothly bent toward the other side face 19 side by a fluid pressure acting force acting on the one side face 19, and as a result, the packing 5 is deformed into a C-shape. Since a distance between the inner peripheral seal face 11 and the outer-peripheral seal face 12 of the packing 5 is reduced by the deformation, a force with which the seal faces 11 and 12 are pressed into contact with the groove bottom 7a of the packing housing groove 7 and the hole inner face of the flow-passage hole 2 is reduced and the squeeze amount of the packing 5 is decreased, and sliding resistance of the packing 5, that is, the sliding resistance of the outer-peripheral seal face 12 is reduced.

Particularly, when the packing 5 is bent, contact positions of the arc-shaped inner-peripheral seal face 11 and the outer-peripheral seal face 12 with the groove bottom 7a of the packing housing groove 7 and the flow-passage hole 2 are changed from the center parts of the respective seal faces to the positions close to the end portion, but if the radiuses of curvature of the inner-peripheral seal face 11 and the outer-peripheral seal face 12 are formed smaller than one half of the width in the radial direction of the packing 5, a degree of reduction in the distance between the contact positions of the both seal faces 11 and 12 is increased with the change in the contact positions, and the sliding resistance is reduced reliably and efficiently.

As mentioned above, the packing 5 slides in the flow-passage hole 2 in a state that the sliding resistance is reduced and reaches a switching position.

The intermediate flexible portion 5C of the packing 5 may be configured such that when the portion is bent by an action of a fluid pressure, as shown in FIG. 3, a part of the side face 19, particularly the center part thereof is brought into contact with the one groove side wall 7b of the packing housing groove 7. In this way, since the packing 5 is brought into contact with the groove side wall 7h at three points, that is, the inner-peripheral seal portion 5A, the outer-peripheral seal portion 5B, and the intermediate flexible portion 5C, the attitude of the packing 5 when curving is stabilized, and adjustment of the distance between the inner-peripheral seal face 11 and the outer-peripheral seal face 12, that is, adjustment of the sliding resistance is facilitated.

Here, the packing 5 can be bent in a smooth C-shape because the intermediate flexible portion 5C has the both right and left flat side faces 19 parallel with each other and is formed with a predetermined thickness Tc. If the both side faces 19 of the intermediate flexible portion 5C are formed in an arc-shaped curve like a prior-art gourd-shaped packing, for example, since the intermediate flexible portion is rapidly broken at a portion with the smallest thickness, the packing is broken in the middle, and the desired purpose cannot be achieved.

In the spool valve in FIG. 1, if the spool 3 is located at a switching position on the left side as illustrated, the second and fourth packings 5 from the left in the spool 3 close the flow-passage hole 2, while the first and third packings 5 open the flow-passage hole 2. Thus, the supply port P and the second output port B communicate with each other, and the first output port A and the first discharge port EA communicate with each other.

At this time, since the first and third packings 5 are not subjected to an action of a fluid pressure or the fluid pressure uniformly acts on the both side faces, the intermediate flexible portion 5C is in a state not bent in either of right or left side as shown in FIG. 2. Therefore, the packing 5 maintains a symmetrical attitude extending linearly in the radial direction.

On the other hand, with regard to the second and fourth packings 5 closing the flow-passage hole 2, since a fluid pressure acts on one of the side faces of the packing 5 as shown in FIG. 3, the intermediate flexible portion 5C is bent to the other side-face direction by the fluid-pressure acting force, and the packing 5 is deformed in a C-shape. By means of this deformation, the packing 5 is in a state in which sliding resistance is reduced.

FIG. 3 shows a bent state of the second packing 5, and a bent direction of the fourth packing 5 is opposite this direction.

If the spool 3 is moved from the above-mentioned switching position to a switching position on the right side, the second and fourth packings 5 are removed from the flow-passage hole 2, a flow passage between the supply port P and the first output port A and a flow passage between the second output port B and the second discharge port EB are opened, the first and third packings 5 are fitted in the flow-passage hole 2, and a flow passage between the first output port A and the first discharge port EA and the flow passage between the supply port P and the second output port B are closed. Therefore, the supply port P and the first output port A communicate with each other, and the second output port B and the second discharge port EB communicate with each other.

At this time, since the second and fourth packings 5 are continuously subjected to the action of the fluid pressure till they are removed from the flow-passage hole 2, they slide in the flow-passage hole 2 while maintaining the bent attitude as in FIG. 3, and the sliding resistance is small.

Also, when the spool 3 is started, a force in a direction in which the packing is raised acts on the second and fourth packings 5 by the sliding resistance of the outer-peripheral seal face 12, the packings 5 start sliding with movement such that the outer-peripheral seal face 12 is peeled off the hole inner face of the flow-passage hole 2, and as a result, the problem of fixation of the packing 5 is also solved.

If the second and fourth packings 5 are removed from the flow-passage hole 2, the fluid pressure no longer acts, and the packings 5 return to the linear attitude as in FIG. 3.

On the other hand, the first and third packings 5 maintain the straightforward attitude till they are fitted in the flow-passage hole 2 and block the flow-passage hole 2, and once they block the flow-passage hole 2, they are deformed into a C-shape as in FIG. 3 by the action of the fluid pressure and slides in the flow-passage hole 2 to the switching position with small sliding resistance while maintaining the attitude.

The above embodiment relates to a spool valve, but the present invention can be applied to a fluid-pressure cylinder or any other fluid-pressure devices in which a sliding member such as a piston is provided with a seal (packing) for movement.

The invention claimed is:

1. A fluid pressure equipment provided with a low-sliding packing, having a housing provided with a flow-passage hole through which a pressure fluid flows and sliding member slidable in the flow-passage hole in an axial direction of the flow-passage hole, in which a packing housing groove is formed in an outer periphery of the sliding member, and a ring-shaped packing is housed in the packing housing groove, characterized in that:

the packing comprises a ring-shaped inner-peripheral seal portion provided with an arc-shaped inner-peripheral seal face brought into contact with a groove bottom of the packing housing groove, a ring-shaped outer peripheral seal portion provided with an arc-shaped outer-peripheral seal face in sliding contact with a hole inner face of the flow-passage hole, and a ring-shaped intermediate flexible portion formed by providing a ring-shaped recess groove with a flat bottom in a region between the inner-peripheral seal portion and the outer-peripheral seal portion on both right and left side faces of the packing and curved by an action of a fluid pressure;

the inner-peripheral seal portion and the outer-peripheral seal portion have both right and left flat side faces in parallel with each other, thickness of the inner-peripheral seal portion and the outer-peripheral seal portion is equal to each other and formed smaller than a groove width of the packing housing groove; and the intermediate flexible portion has both right and left flat side faces in parallel with each other, the thickness of the intermediate flexible portion is formed smaller than the thickness of the inner-peripheral seal portion and the outer-peripheral seal portion, and a ring width of the intermediate flexible portion in the packing radial direction is formed equal to or larger than the thickness of the intermediate flexible portion.

2. The fluid pressure equipment according to claim 1, wherein radiuses of curvature of arcs of the inner-peripheral seal face and the outer-peripheral seal face of the packing are smaller than one half of the width of the packing in the radial direction, and the radius of curvature of the outer-peripheral seal face is smaller than the radius of curvature of the inner-peripheral seal face.

3. The fluid pressure equipment according to claim 1, wherein the ring width of the intermediate flexible portion of the packing is larger than ring widths of the inner-peripheral seal portion and the outer-peripheral seal portion.

4. The fluid pressure equipment according to claim 2, wherein the ring width of the intermediate flexible portion of the packing is larger than ring widths of the inner-peripheral seal portion and the outer-peripheral seal portion.

5. The fluid pressure equipment according to claim 1, wherein the intermediate flexible portion of the packing is brought into contact with one groove side wall of the packing housing groove when being bent by an action of a fluid pressure.

6. The fluid pressure equipment according to claim 2, wherein the intermediate flexible portion of the packing is brought into contact with one groove side wall of the packing housing groove when being bent by an action of a fluid pressure.

7. The fluid pressure equipment according to claim 3, wherein the intermediate flexible portion of the packing is brought into contact with one groove side wall of the packing housing groove when being bent by an action of a fluid pressure.

8. The fluid pressure equipment according to claim 4, wherein the intermediate flexible portion of the packing is brought into contact with one groove side wall of the packing housing groove when being bent by an action of a fluid pressure.

* * * * *